United States Patent
Coupard et al.

(10) Patent No.: US 7,994,377 B2
(45) Date of Patent: Aug. 9, 2011

(54) METHOD OF CONVERTING ETHANOL TO BASE STOCK FOR DIESEL FUEL

(75) Inventors: Vincent Coupard, Vaulx En Velin (FR); Sylvie Maury, Charly (FR); Frédéric Capuano, Saint Maurice d'Argoire (FR); Mohamed Bengrine, Chalon sur Saone (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 749 days.

(21) Appl. No.: 11/754,596

(22) Filed: May 29, 2007

(65) Prior Publication Data

US 2007/0287873 A1   Dec. 13, 2007

(30) Foreign Application Priority Data

May 30, 2006   (FR) .................................. 06 04928

(51) Int. Cl.
*C07C 1/00* (2006.01)

(52) U.S. Cl. ........ 585/639; 585/469; 585/640; 585/733; 585/773; 502/235; 208/143

(58) Field of Classification Search .................. 585/469, 585/639, 640, 733, 773; 502/235; 208/143
See application file for complete search history.

(56) References Cited

U.S. PATENT DOCUMENTS

| | | | |
|---|---|---|---|
| 3,441,498 A * | 4/1969 | Jubin, Jr. et al. | 208/143 |
| 4,467,133 A | 8/1984 | Chang et al. | |
| 5,063,187 A | 11/1991 | Burgfels et al. | |
| 6,110,879 A * | 8/2000 | Kramer et al. | 508/469 |
| 6,372,949 B1 * | 4/2002 | Brown et al. | 585/639 |
| 2004/0092390 A1 * | 5/2004 | Timken | 502/235 |

FOREIGN PATENT DOCUMENTS

| EP | 0 022 640 A | 1/1981 |
|---|---|---|
| EP | 1 410 844 A | 4/2004 |

OTHER PUBLICATIONS

Stocker M., Methanol-to-hydrocarbons: catalytic material sand their behavior, Microporous and Mesoporous Materials, Jun. 1999, pp. 3-48, 29(1-2), Elsevier Science Publishing, New York, NY.

Withcraft, David R et al., Recovery of Ethanol From Fermentation Broths by Catalytic Conversion to Gasoline, Industrial and Engineering Chemistry Process Design and Development, 1983, pp. 452-457, vol. 22.

M. Stocker, "Methanol-to-Hydrocarbons: Catalytic Materials and Their Behavior", Microporous and Mesoporous Materials, vol. 29, Issues1-2, Jun. 1999, pp. 3-48.

* cited by examiner

*Primary Examiner* — Prem C Singh
(74) *Attorney, Agent, or Firm* — Millen, White, Zelano & Branigan, P.C.

(57) ABSTRACT

For converting ethanol to a diesel fuel base stock:
a reaction stage (a) of contacting the ethanol with an acid catalyst, amorphous or structured, predominantly mesoporous, at a temperature of 300° C. to 500° C., at a pressure of 2 to 10 MPa and at a WHSV of 0.2 to 4 h$^{-1}$, producing a gas phase, an organic liquid phase and an aqueous liquid phase, and —a stage (b) of separating the gas phase, the organic liquid phase and the aqueous liquid phase at a pressure close to the reaction pressure, and recycling at least part of the gas phase separated in stage (b) to stage (a), and hydrogenating at least part of the organic liquid phase separated in stage (b).

18 Claims, 4 Drawing Sheets

METHOD OF CONVERTING ETHANOL TO BASE STOCK FOR DIESEL FUEL

FIELD OF THE INVENTION

The present invention relates to the conversion of ethanol to a diesel fuel base stock.

It more particularly relates to a catalytic method of converting ethanol, pure or containing water, to a diesel fuel base stock.

BACKGROUND OF THE INVENTION

There is an increasing demand for the use of biomass for partly replacing petroleum resources for the synthesis of fuels. The use of bioethanol for the synthesis of base stocks for fuels therefore arouses a great interest. The production of liquid hydrocarbons on acid solids has been mentioned by some authors during ethanol conversion reactions (H. Van Bekkum et al., Applied Catalysis, 3 (1982)). However, they took no interest in the optimization of the gas oil yield.

The reaction at the root of the method of converting ethanol to a base stock for diesel fuel is dehydration-oligomerization of the ethanol in a single stage according to Equation (1) below:

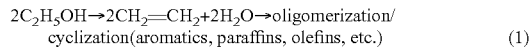

$$2C_2H_5OH \rightarrow 2CH_2=CH_2 + 2H_2O \rightarrow \text{oligomerization/cyclization(aromatics, paraffins, olefins, etc.)} \quad (1)$$

It is well known that dehydration of ethanol occurs quite easily on acid solids of low acidity at temperatures above 300° C. and at atmospheric pressure. The reaction products are then mainly water and ethylene, ethylene being obtained with a selectivity above 96%. The most commonly used catalysts are silica-aluminas, unprocessed zeolites (ZSM-5) or zeolites modified by steaming, or asbestos-derived zeolites. The use of a triflic acid-treated ZSM-5 zeolite (R. Le Van Mao et al., The Bioethanol-to-Ethylene (B.E.T.E.) Process, Applied Catalysis, 48 (1989)), or of a microporous niobium silicate AM-11 (P. Brandao et al., Dehydration of Alcohols by Microporous Niobium Silicate AM-11, Catalysis Letters, 80, 3-4 (2002)) have also been mentioned in the prior art. A relatively old study mentions the production of aromatics up to 50% from ethanol over ZSM-5 at temperatures above 260° C. For lower temperatures, only the formation of ethylene is mentioned. The presence of water in the ethanol feedstock seems to promote the formation of aromatics, in opposition to the conclusions of A. T. Aguayo et al. (J. Chem. Technol. And Biotechnol., 77 (2002)). The presence of water would also have the effect of limiting the deactivation of the catalyst[5,6]. On the other hand, for temperatures above 450° C., there is a risk of catalyst dealumination.

Ethylene oligomerization requires high pressures, generally ranging between 2 and 4 MPa, but lower temperatures, generally between 20° C. and 200° C. The catalysts used are in most cases transition metals deposited on silica-alumina type supports, zeolites (ZSM-5) or mesoporous solids (MCM-41) as described by V. Hulea et al., J. Catal., 225 (2004).

Few authors have reported the dehydration-oligomerization of ethanol in a single stage. The few studies mentioned (S. Sivasanker et al., S. Assam Science Society, 36(3), (1994) or D. R. Whitcraft et al., Ind. Eng. Chem. Process Dev., 22, (1983)) thus show the production of gasoline cuts by reaction of ethanol at high pressure and temperature over ZSM-5. However, the yields obtained are rather low and the heavy cut ($T_{boiling}$>220° C.) represents a small percentage (<3%). The formation of aromatics is mentioned: it depends on the pressure and on the Si/Al ratio of the zeolite. Advanced kinetic studies concerning the conversion of aqueous ethanol over H-ZSM-5 zeolites to hydrocarbons were carried out by A. T. Aguayo et al. as mentioned above. However, the reactions occur at atmospheric pressure and at high temperature; the products obtained are not detailed, but their molecular mass is low (C5+).

The reaction of converting ethanol to produce hydrocarbons (dehydration-oligomerization in a single stage) has mainly been studied on ZSM-5 zeolite (M. M. Chang et al., "The Conversion of Methanol and Other O-Compounds to Hydrocarbons over Zeolite Catalysts", J. Catal. 47, 249-259). The main goal was to produce gasoline type effluents, but no author attempted to optimize the yield in liquid hydrocarbons with a boiling point temperature above 150° C.

K. G. Bhattacharyya et al. ("Production of Hydrocarbons from Aqueous Ethanol over HZM-5 under High Pressure", Journal of Assam Science Society 36(3), pp 177-188 (1994)) are the only ones who took an interest in the results in terms of diesel cut production. However, they have not tried to optimize the operating conditions or the catalyst. The tests were carried out at 3 MPa and 400° C. on an H-ZSM-5 zeolite of Si/Al ratio 103, i.e. of relatively low acidity. The diesel cut fraction (270-370° C.) obtained is then only 0.6%. The operating conditions vary a lot from one study to the next but the pressure generally favours the formation of liquid products (>C5+), temperatures above 350° promote the oligomerization of ethylene, the primary product from the reaction of ethanol from 300° C. Above 350° C., the formation of aromatics becomes significant, notably over H-ZSM-5. This catalyst is by far the most stable of all the zeolites studied (mordenite, Y or beta).

The addition of metals by ionic exchange has been studied by J. F. Schulz et al. ("Conversion of Ethanol over Metal-exchanged Zeolites", Chem. Eng. Technol. 16 (1993) 332-337), who showed the influence of nickel on the formation of aromatics. According to them, addition of this metal allows to stabilize the aluminium sites of the zeolites, thus preventing crystallinity loss. A low Si/Al ratio of the catalyst favours the formation of aromatics. According to Valle B. et al. ("Effect of Nickel Incorporation on the Acidity and Stability of HZSM-5 Zeolite in the MTO Process", Catalysis Today 106 (2005) 118-122), in the case of the "Methanol to Olefins" process, which requires a high temperature and takes place in the presence of a large amount of water, addition of nickel by impregnation allows the H-ZSM-5 zeolite to be stabilized. The presence of nickel causes the acidity of the catalyst (strength and number) to fall. However, a 1% nickel content allows the catalyst to be made regenerable without activity loss, unlike the parent solid that deactivates. Machado et al. ("Obtaining Hydrocrabons from Ethanol over Iron-modified ZSM-5 Zeolites", Fuel 84, 2064-2070) modified a ZSM-5 of Si/Al ratio 20 (previously exchanged to obtain the protonic form) by impregnation with Fe(NO$_3$)$_3$, 9H$_2$O) or by ion exchange with FeCl$_3$, 6H$_2$O.

The ZSM-5 zeolite is considered to be microporous since the major part of its pores is smaller than 20 Å.

On the other hand, some authors have compared the dehydration and oligomerization mechanisms of ethanol and of methanol. Derouane et al (J. Catal, 53, 40-55 (1978)) notably showed that the behaviour of these two alcohols in the conversion reaction over acid solids was different. Thus, under identical conditions, at 250° C., more than 98% of the ethanol is converted to ethylene whereas the main product detected from methanol (74%) is dimethyl ether. Espinoza et al (App.

Catal, 6, 11-26 (1983)) show that 93% of the ethanol is converted to ethylene at 380° C. and 49% of the methanol is converted to C5+.

The mechanism is obviously different for the two alcohols: in fact, methanol first has to react with itself to form dimethyl ether by eliminating a first water molecule, then the elimination of a second water molecule allows to obtain the ethylene that can thereafter grow via the formation of a longer ether (by addition of a methoxy group on a $C_2$ carbocation thus leading to the formation of propylene), or by reaction with another ethylene molecule.

Above 300° C., the conversion of ethanol predominantly goes through the formation of ethylene (directly produced by intramolecular dehydration of the alcohol or via the diethyl ether), the growth of the chains thus occurring via carbocationic intermediates (formation of even chains).

In conclusion, the state of the art as regards patent applications for a method allowing conversion of ethanol to a base stock for diesel fuel by means of dehydration-oligomerization in a single stage comprises no pertinent anteriority. The scientific literature essentially took an interest in the conversion of ethanol to an aromatic base, insofar as the diesel fraction obtained did not exceed 1% by mass.

OBJECT OF THE INVENTION

One objective of the method according to the invention is to convert ethanol feestocks, possibly produced biologically, predominantly to hydrocarbon base stocks that can be blended in the diesel pool in a single reaction stage, without any stability problem or need to add compatibilizers to obtain homogeneous mixtures.

Another objective of the invention is to keep all the reaction products at the various reaction stages without bringing any change to the operating conditions to separate the aqueous phase. The water formed during the dehydration stage must be able to remain in the form of gas in the reactor(s) used, without condensing in liquid form between the dehydration and the oligomerization stage. Thus, even if several reactors are used, one advantage of the invention is that it requires no decantation of the water between the various reactors, and that is thus allows to perform the most complete conversion possible of ethanol to base stock for gas oil, while keeping the water formed by the reaction in gaseous form.

Surprisingly enough, it has been discovered that, contrary to what could be expected from the prior art, the catalysts allowing conversion of ethanol to a base stock for diesel fuel are catalysts of moderate acidity.

SUMMARY OF THE INVENTION

The method of the invention can be defined as a method of converting ethanol to a base stock for diesel fuel, comprising:

a reaction stage (a) of contacting the ethanol with an acid catalyst, amorphous or structured, predominantly mesoporous, i.e. comprising at least 60% pore whose size ranges between 2-50 nm, producing a gas phase, an organic liquid phase and an aqueous liquid phase, and a stage (b) of separating the gas phase, the organic liquid phase and the aqueous liquid phase at a pressure close to the reaction pressure.

According to the invention, it has been surprisingly possible to find different catalysts, of variable acidity, amorphous or structured, predominantly mesoporous, allowing to convert the ethanol to a base stock for diesel fuel in a single reaction stage.

What is referred to as mesoporosity is a range of pore sizes from 2 to 50 nm. This porosity is measured by mercury or nitrogen intrusion volume. A predominantly mesoporous compound according to the invention comprises at least 60% mesopores and preferably at least 70% mesopores.

DETAILED DESCRIPTION

Figure 1:
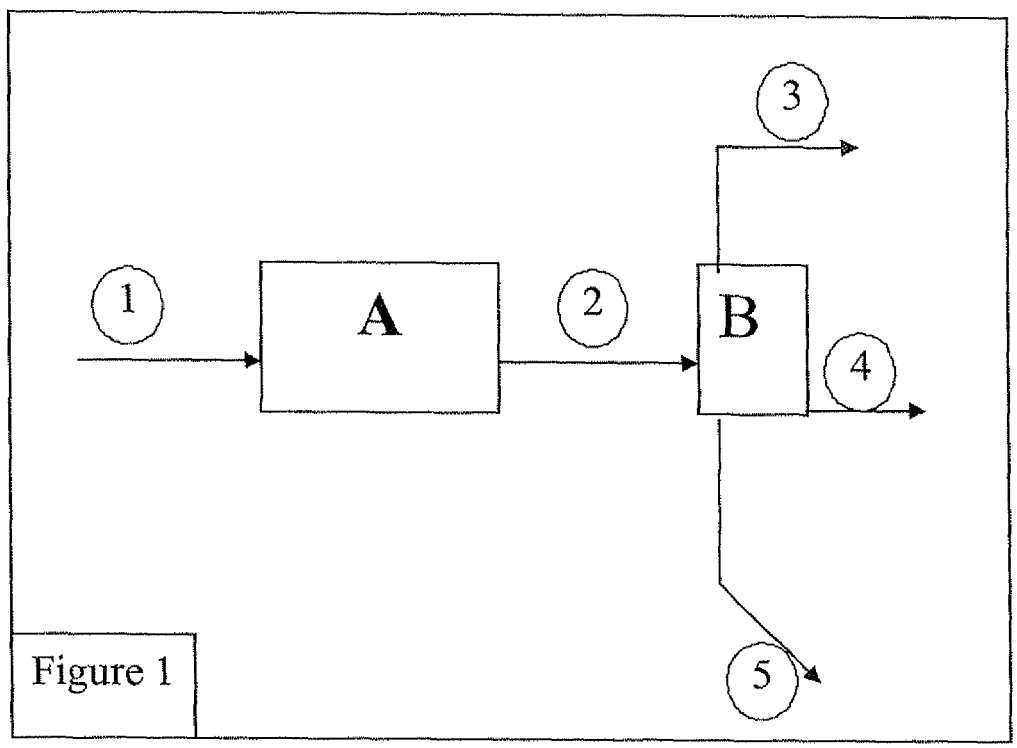
FIG. 1 diagrammatically shows the dehydration-oligomerization method according to the present invention in the direct version thereof, without recycling.

The method according to the invention relates to various ethanol feedstocks, possibly produced biologically, containing variable proportions of water. For information, Table 1 hereafter gives conventional compositions of the ethanol batches that can be used as feedstocks for the method according to the invention.

TABLE 1

| | Feedstock type | |
|---|---|---|
| | Top quality EtOH | Crude EtOH |
| Analyses | | |
| Total sulfur mg/l | <0.2 | <0.2 |
| Total nitrogen mg/l | <1 | 5.4 |
| Na mg/l | 0.86 | 0.8 |
| Ca mg/l | 0.41 | 1.09 |
| Mn mg/l | <0.02 | <0.02 |
| Fe mg/l | 0.15 | <0.03 |
| Cu mg/l | <0.05 | 0.08 |
| Zn mg/l | 0.03 | 0.03 |
| Analyses | | |
| Alcohol strength % vol (at 20° C.) | 96.3 | 92.9 |
| Total acidity (acetic acid) | 0.8 | 0.4 |
| Dry extract g/hl | 2 | 3.9 |
| Fixed acidity g/hl (H2SO4) | <0.1 | <0.1 |
| Esters g/hl | <0.1 | 12.3 |
| Acetaldehyde/acetal sum (acetaldehyde) | 4.25 | 10.8 |
| Methanol g/hl | <0.05 | 9.4 |
| Butanol-2 g/hl | <0.05 | <1.0 |
| Propanol-1 g/hl | <0.1 | 58.1 |
| Methyl-2 Propanol-1 g/hl | n.d. | 30.4 |
| Propen-2 ol-1 g/hl | <0.05 | <1.0 |
| Butanol-1 g/hl | n.d. | <1.0 |
| Methyl-2 butanol-1 g/hl | n.d. | 27.3 |
| Methyl-3 butanol-1 g/hl | <0.05 | 58.2 |
| Methyls-butanol-1 g/hl | <0.1 | 85.5 |
| Total higher alcohols g/hl | | 174.6 |
| Volatile nitrogenated bases* mg/kg | <0.2 | 1.2 |
| Aspect | limpid-colourless | limpid-colourless |

*The results given in mg/kg are expressed in relation to the anhydrous product

In dehydration-oligomerization reaction stage (a) of the method according to the invention, the catalyst is generally selected from among the delta, gamma and eta aluminas, mesoporous and macroporous, with a majority of mesopores, and the silica-aluminas.

Gamma or delta aluminas can be used more particularly, obtained by granulation or extrusion and meeting the external surface area criteria ranging between 130 and 350 m$^2$/g and the pore volume criteria, measured by mercury intrusion, ranging between 0.3 and 1.2 cm$^3$/g. Alumina, for example gamma alumina, shaped by means of the "Oil Drop" process, is preferably used. Catalyst IS463 marketed by the Axens company (formerly Procatalyse) can be mentioned as a good catalyst for this conversion. It corresponds to a gamma alumina catalyst having an external surface area of 200 m$^2$/g and a pore volume of 0.59 cm$^3$/g. A possible process for shaping these balls is described in patents GB-B-2134536, EP-B-01 5801 and EP-B-097539.

These solids can thereafter be treated by silica so as to become amorphous silica-aluminas, this method being known to the man skilled in the art for increasing the hydrothermal stability of catalysts. U.S. Pat. No. 5,545,793 describes the method of preparation for such a solid.

Finally, amorphous silica-aluminas with a silica ratio ranging between 10 and 90% by mass and having an external surface area of the order of 200 to 480 m$^2$/g (SBET measurement) have a good resistance to the partial pressure of water generated by the initial dehydration reaction. The silica-alumina Siralox 30 marketed by the Condea Company can for example be mentioned as a solid that can be used for the application described. The porosity, measured by mercury intrusion, of a solid of this type ranges between 0.5 and 1.5 cm$^3$/g. Also in the case of silica-aluminas, those whose pore size distribution shows the presence of mesopores and of macropores, with a majority of mesopores, will be used.

In stage (a) of the method according to the invention, the catalyst is generally contacted with the fresh ethanol under the reaction conditions, generally at a temperature ranging between 300° C. and 500° C., and at an absolute total pressure ranging between 2 and 10 MPa, the WHSV (weight hourly space velocity, i.e. weight of feedstock per weight of catalyst and per hour) delivery of the ethanol feedstock on the catalyst ranging generally between 0.2 and 4 h$^{-1}$.

The method according to the invention is described hereafter in its first variant, in connection with FIG. 1.

Feedstock (1) contains ethanol and water, with a proportion of ethanol of at least 40% by mass. A feedstock containing at least 90% by mass of ethanol is preferred. This feedstock is brought to the reaction conditions by a set of pumps, heat exchangers and ovens (not shown in FIG. 1) up to reactor A.

A radial-bed reactor is advantageously selected as reactor A in order to minimize the pressure drop through the catalytic bed. One or more reactors can be used. It is possible to use a reactor with one or more fixed beds or a reactor with one or more moving beds, coupled with a continuous regeneration system. Two radial fixed bed reactors are preferably used with a set of valves allowing permutation between a test phase and a regeneration phase.

It can be noted that, the reaction being globally exothermic, a heat exchange system known to the man skilled in the art allows to minimize the energy consumption under normal running conditions.

Regeneration of the catalyst is generally carried out in an air stream. It is possible to recirculate the combustion air with or without water in order to dilute the oxygen and to control the regeneration exothermy. In this case, the oxygen content at the reactor inlet has to be adjusted by means of makeup air. Regeneration is performed at a pressure ranging between the atmospheric pressure (0 MPa relative pressure) and the reaction pressure. The regeneration temperature is selected between 400° C. and 600° C.; it can vary during the regeneration process. Regeneration end is detected when there is no more oxygen consumption.

At the outlet of reactor A, reaction effluent (2) is kept at its reaction pressure, except for the pressure drops in the equipments it flows through. The effluent is cooled below the dew point of water. Condensation of an organic liquid is thus simultaneously caused. It is fed into a device B allowing three-phase separation of a gas phase (3) notably consisting of ethylene, an organic liquid (4) (gasoline and gas oil) and an aqueous liquid (5) (water, unreacted ethanol, solubilized hydrocarbons). Typically, this separator B can be a separating drum containing internals of baffle or mist separator type allowing to minimize the volume required for the organic liquid-aqueous liquid decantation, on the one hand, and the organic liquid-organic gas decantation on the other. The residence time in this internal is advantageously greater than 1 minute in order to allow these phase separations to take place. The temperature of the separator is generally selected so as to recover at least 80% of the gas oil fraction produced in the reaction. It can range for example from 60° C. to 200° C., for a pressure of about 3 MPa.

Aqueous phase (5) at the separator outlet predominantly consists of water and solubilized hydrocarbons. Prior to being discharged, for field irrigation purposes for example, this aqueous phase is treated, the separated oil being recovered for example in the trucks used for conveying the ethanol to the conversion site.

Organic liquid (4) contains less than 20% by weight of aromatic compounds.

Implementation with Recycling

The man skilled in the art commonly defines the diesel pool as a group of hydrocarbons whose boiling point can range between 150° C. and 370° C. It is well known to the man skilled in the art that gas oil is essentially characterized, in addition to its volatility, by its cetane number. It is also well known that the cetane number is favoured by linear hydrocarbons having a low branching ratio, disadvantaged by aromatics and greatly branched chains, and finally greatly disadvantaged by hydrocarbons containing several aromatic rings, possibly adjacent (such as naphthalene).

These definitions being thus reminded, their effect as regards the invention is that one attempts to carry out a conversion by successive oligomerization of ethylene and/or addition of an ethylene to a hydrocarbon present in the reactor. This oligomerization mode has the advantage of creating predominantly linear products, thus with an a priori good cetane number, if the desired distillation range of 150° C.-370° C. is reached. Unfortunately, product degradation reactions also occur. These reactions are essentially hydrogen transfer reactions that degrade the olefinic chains formed to naphthenic, then aromatic cycles. There are also reactions of isomerization of the linear hydrocarbon skeleton to iso-olefins and cracking reactions that limit the growth of the hydrocarbon chains.

Figure 2:
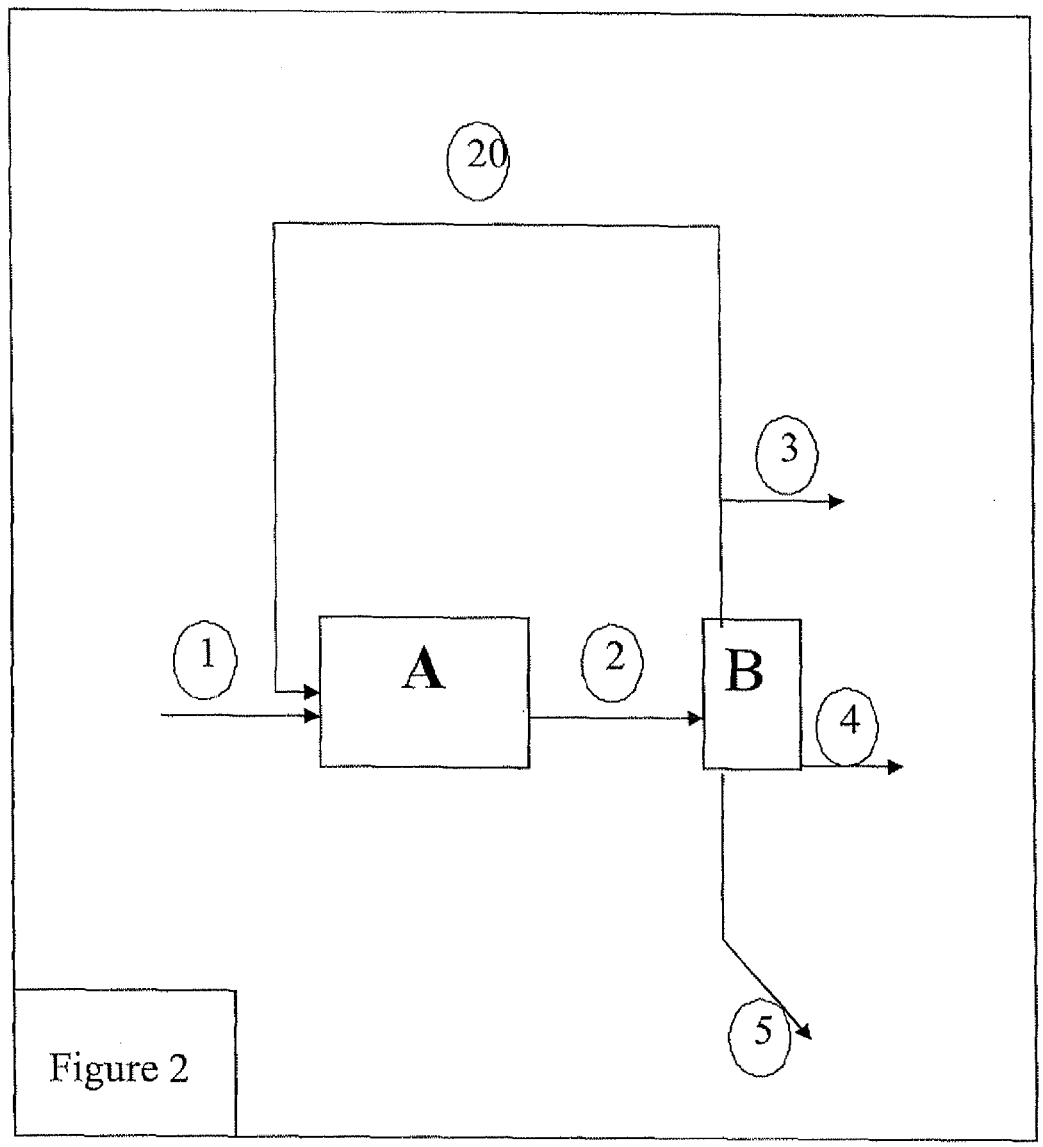
FIG. 2 diagrammatically shows a variant of the method according to the invention involving a stage of recycling at least part of the gas phase separated after the dehydration-oligomerization reaction.

This is the reason why, in a variant of the method according to the invention diagrammatically shown in FIG. 2, one considers recycling the separated gas phase to the inlet of the ethanol dehydration-oligomerization reaction, the object of recycling being to practically achieve the growth of the olefinic hydrocarbons that have not yet reached the desired volatility.

The catalyst is then contacted with fresh ethanol to which a recycle of unwanted products from the process has been added, the goal of recycling being to end the conversion, essentially as regards the volatility of the products formed. Thus, the recycled gasoline from the process is again oligomerized in the reactor, or ethanol from the dehydration of the fresh ethanol is added thereto. The overall boiling point of the product formed is thus significantly increased. Several successive recycling procedures can be performed so as to weight up this gasoline sufficiently to make it compatible with the diesel pool in terms of boiling point.

In this variant, the temperature of the separator can be adjusted so as to recycle a maximum amount of products unconverted to diesel up to the light gasoline fraction.

The recycle rate is imposed by the temperature. Once the temperature set, part of the products can be revaporized and the other part is discharged.

Recycling can be carried out after simple evaporation of the light fraction of the product. This evaporation can be achieved in a vessel providing a product residence time above 1 minute, the vapour phase being thus separated from the organic liquid phase and from the aqueous liquid phase.

In order not to accumulate the inerts that are created in the process by hydrogen transfer to ethylene, thus forming ethane, part of the gases, generally 1 to 30% by mass, in most cases at most 10% by mass, is discharged. This purge (3) predominantly contains ethylene, as well as CO, $CO_2$, $CH_4$ and hydrogen, and water traces. It can be advantageously used as fuel in the ovens of the process.

The rest, generally 70 to 99% by mass, in most cases at least 90% by mass, is recycled to the reactor inlet (stream 20). This fraction of the gas phase is generally subjected to recompression prior to being re-injected to stage (a) in admixture with the fresh ethanol.

Part of the ethanol is also dehydrogenated to acetaldehyde, a product that is unstable under the reaction conditions. This product then breaks up into CO, $CO_2$, $CH_4$ and $H_2$.

Implementation With Hydrogenation

Figure 3:
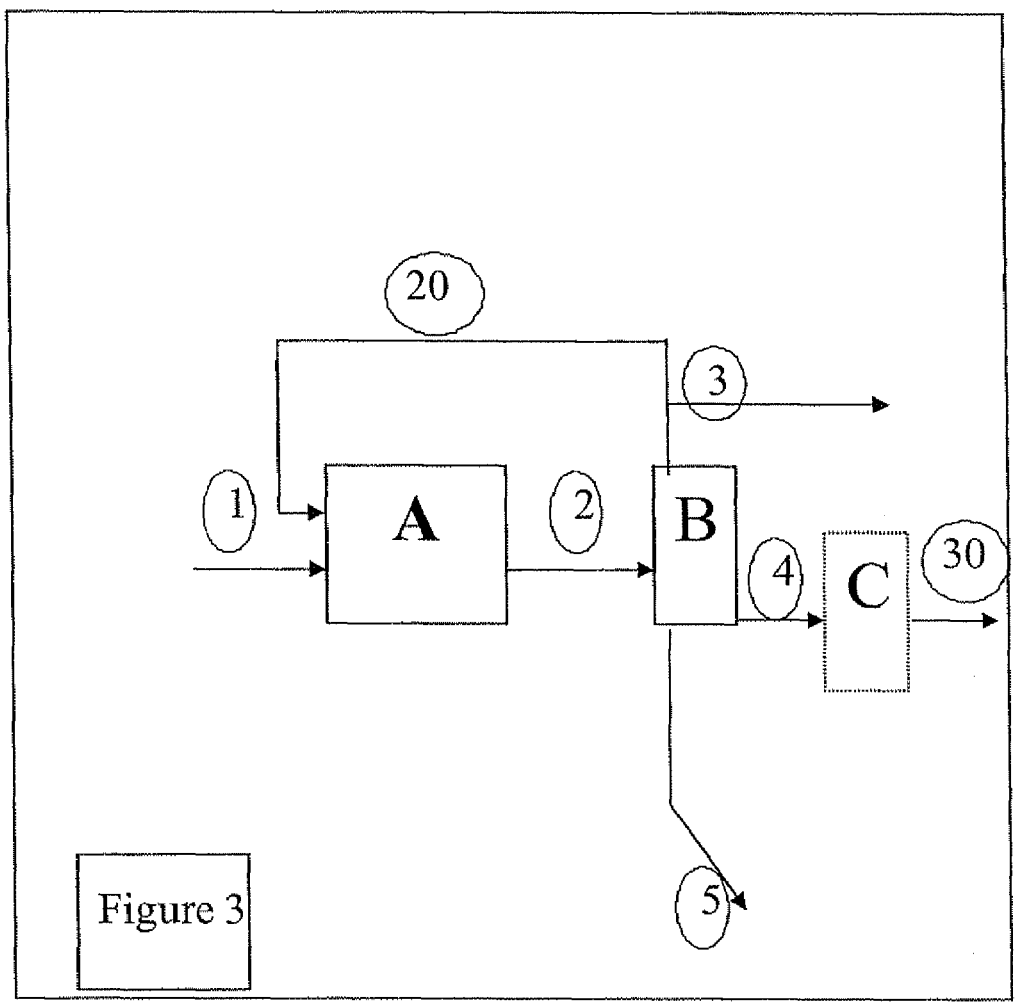
FIG. 3 diagrammatically shows a variant of the method according to the invention involving hydrogenation of at least part of the organic liquid phase separated after the dehydration-oligomerization reaction.

In another advantageous variant of the method according to the invention, as regards the liquid products obtained, organic liquid cut (4) obtained by the process, with or without recycling, can be led to a hydrogenation of the remaining olefins in order to achieve a cetane gain. This variant is diagrammatically shown in FIG. 3.

All or part of liquid effluent (4) is contacted, in a reaction zone C, with a hydrogen-rich gas over a catalyst containing for example a metal from group VIII, which can be palladium or nickel, on a support of alumina or silica or silica-alumina type, in order to achieve hydrogenation of the diolefins and/or hydro-isomerization and/or hydrogenation of the olefins.

The metal content generally ranges from 0.1 to 10% by mass in the case of palladium and from 1 to 60% by mass in the case of nickel. The operating conditions of this hydrogenation in the liquid phase generally involve LHSVs (liquid hourly space velocities) from 1 to 8 $h^{-1}$, a temperature between 100° C. and 250° C. at the reactor inlet and an operating pressure between 2 and 5 MPa. The hydrogenation performance is validated by measuring the bromine number that is advantageously at most 1 g Br/100 g, if it is desired to saturate all of the unsaturated compounds present in the cut.

Effluent (30) from reaction zone C predominantly contains hydrocarbons that, because of their boiling point range, can be incorporated in the diesel pool. It can be used directly in the commercial diesel or fractionated into a heavy gasoline cut and/or a kerosine cut and/or a gas oil cut prior to blending in the diesel pool.

The following examples illustrate the invention. They are in no way limitative. Example 1 is given by way of comparison.

The ethanol feedstock treated in these examples is an industrial ethanol with an alcohol strength of 93%.

Example 1

Comparison

A pilot plant with a traversed bed is fed with a mixture of 50% by mass of alumina and 50% by mass of zeolite Y, in form of extrudates (the catalyst is designated by USY and it is considered to be microporous). 75 g catalyst are used.

Prior to the test proper, the solid is activated at 550° C. in an air stream for 2 h. This activation consists of a calcination aimed at combustion of the oil and grease traces, and at drying of the catalyst before using it.

75 g/h ethanol are injected onto this catalyst, with a nitrogen dilution (inlet and outlet nitrogen taken away from the balance calculation) of 40 Nl/h. At the reactor outlet, the gas phase, the organic liquid phase and the aqueous liquid phase are separated. The test lasts for 50 h. No recycling is performed. The reaction conditions used are as follows: temperature 400° C., the reactor being isothermal and pressure 3 MPa.

Various balances are performed during the test. The mass balances presented have been corrected of the water present with the feedstock (water removed from the feedstocks and the products). These balances are carried out over a period of 8 to 12 h and end at the time indicated in the line "feeding time".

The material balance is given in table 2 below.

TABLE 2

| USY test (3 MPa) | Balance 1 | Balance 2 | Balance 3 | Balance 4 |
|---|---|---|---|---|
| Feeding time (hours) | 8 | 16 | 24 | 32 |
| Feedstock EtOH Mass Water ethanol removed feedstock - product | 100 | 100 | 100 | 100 |
| Aqueous phase | | | | |
| Total aqueous yield | 43.8 | 45.4 | 50.7 | 46.8 |
| Organic phase | | | | |
| Total organic yield | 0 | 2.8 | 0 | 4.3 |
| Gas phase | | | | |
| Gas hydrocarbon | 56.7 | 49.9 | 45.5 | 46.5 |
| H2 | 0.3 | 0.4 | 0.4 | 0.4 |
| CO | 0.6 | 0.8 | 0.8 | 0.8 |
| CO2 | 0.3 | 0.2 | 0.1 | 0.1 |
| Total Gas Phase | 57.9 | 51.3 | 46.8 | 47.8 |
| Total | 101.7 | 99.5 | 97.5 | 98.9 |

The experimental mass balance shows that the hydrocarbon liquid phase produced comes in small amounts, even though dehydration of the ethanol is complete.

The hydrocarbon part of the gas phase predominantly contains ethylene and ethane, as well as C1, C3, C4 and C5 hydrocarbon traces, and small amounts of CO, $CO_2$ and hydrogen.

The organic liquid formed contains hydrocarbons whose boiling point ranges between 20° C. and 400° C. The gas oil fraction contained in this product is 50% by mass.

Example 2

According to the Invention

A pilot plant with a traversed bed is fed with a commercial solid called IS463, marketed by the Axens company (formerly Procatalyse), also referred to as GOD200 (in-house designation). 75 g of gamma alumina type catalyst with an external surface of 200 m²/g and pore volume of 0.59 cm³/g are used. This catalyst is an acid catalyst, predominantly mesoporous.

Prior to the test proper, the solid is activated at 550° C. in an air stream for 2 h. This activation consists of a calcination aimed at combustion of the oil and grease traces, and at drying of the catalyst before using it.

75 g/h ethanol are injected onto this catalyst, with a nitrogen dilution (inlet and outlet nitrogen taken away from the balance calculation) of 40 Nl/h. At the reactor outlet, the gas phase, the organic liquid phase and the aqueous liquid phase are separated. No recycling is performed. The reaction conditions used are as follows: temperature 400° C., the reactor being isothermal, and pressure 3 MPa.

The duration of the test, 96 h 30, allowed to carry out 12 balances. Analyses on the aqueous and organic yields were carried out on balances 2, 5, 7, 9 and 12.

Table 3 hereafter gives the material balance obtained in this example.

TABLE 3

| GOD200 test (400° C.-3 MPa) | Balance 2 | Balance 5 | Balance 7 | Balance 9 | Balance 12 |
|---|---|---|---|---|---|
| EtOH | 100 | 100 | 100 | 100 | 100 |
| Aqueous phase | | | | | |
| Water | 33.6 | 35.0 | 36.4 | 35.1 | 33.8 |
| HC aqueous yield | 1.8 | 2.4 | 3.6 | 5.5 | 10.3 |
| Total aqueous yield | 35.4 | 37.4 | 40.0 | 40.6 | 44.1 |
| Organic yield | 18.4 | 17.0 | 11.8 | 8.1 | 5.2 |
| Gas phase | | | | | |
| HC gas | 38.6 | 40.7 | 46.9 | 48.9 | 48.9 |
| H2 | 0.9 | 0.8 | 0.6 | 0.5 | 0.4 |
| CO | 2.0 | 2.0 | 1.2 | 0.9 | 0.6 |
| CO2 | 0.9 | 0.9 | 0.7 | 0.5 | 0.3 |
| Total gas phase | 42.4 | 44.4 | 49.4 | 50.8 | 50.2 |
| Total | 96.2 | 98.8 | 101.2 | 99.5 | 99.5 |

The aqueous and organic phase analyses show the nature of the compounds formed.

The amounts of liquid organic phase produced are clearly larger than those obtained with a microporous USY type catalyst.

In the organic yield, the olefinic compounds are the majority (on average about 50% by mass) and the C6 olefins are the majority of the olefins. There are also C4 and some C8. Surprisingly, 40% of the hydrocarbon fraction has a boiling point temperature above 150° C., therefore compatible with the diesel pool. This fraction is constant throughout the test. The organic liquid phase also contains about 15% aromatics.

The hydrocarbon part of the gas phase predominantly contains ethylene and ethane, as well as C1, C3, C4 and C5 hydrocarbon traces, and small amounts of CO, $CO_2$ and hydrogen.

A possibility to follow the quality of the products obtained by the process described in the example here above, is to obtain the simulated distillation curve of these products. The simulated distillation is a well-known method by one skilled in the art, that is close to the ASTM distillation such as described in "*Raffinage et génie chimique, P. Wuithier, Edition Technip* (1965), Tome I, p 7" and in the articles "*Oil & Gas Science and Technology—Rev. IFP*, Vol. 62 (2007), No. 1, pp. 33-42, *Oil & Gas Science and Technology—Rev. IFP*, Vol. 54 (1999), No. 4, pp. 431-438."

Figure 4:
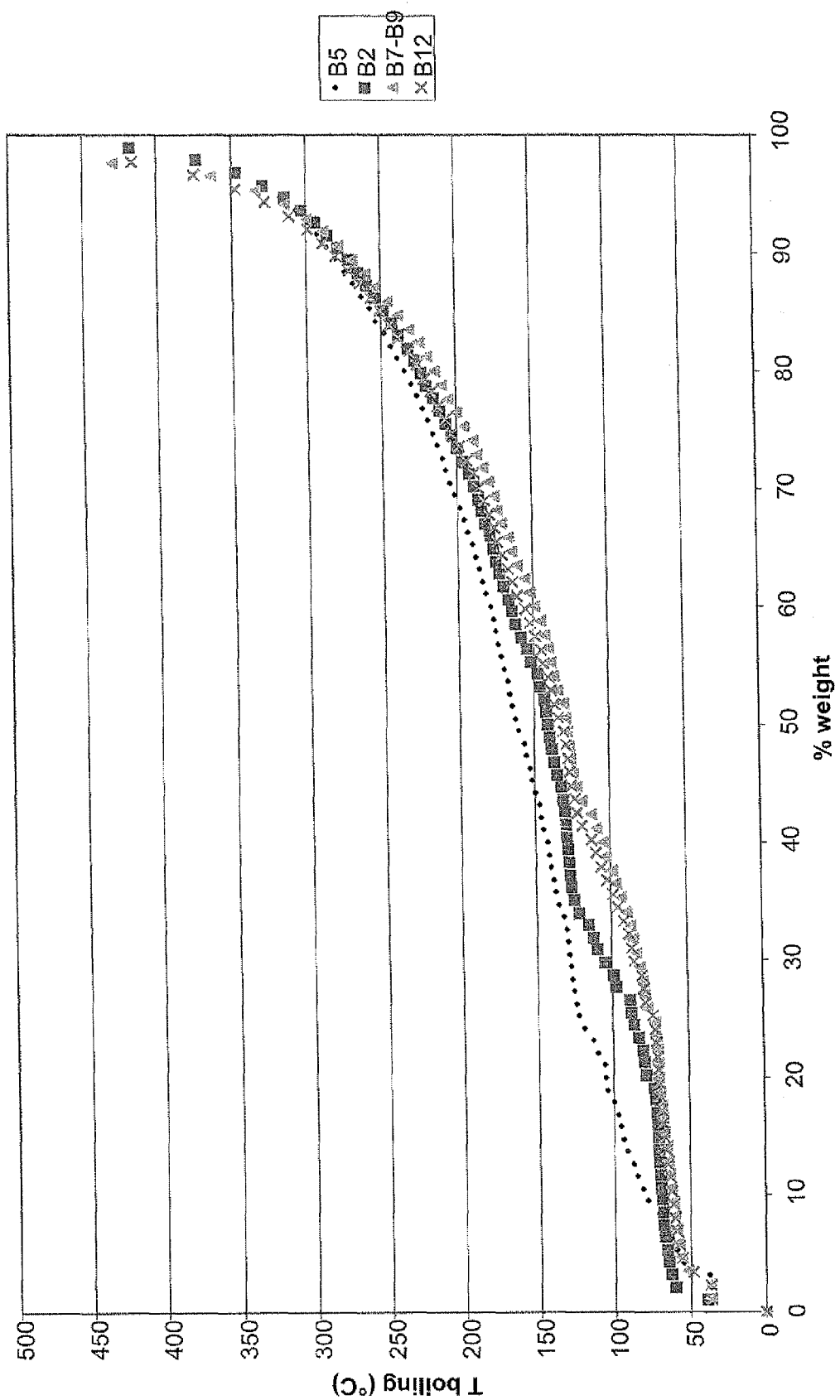
FIG. 4 represents a simulated distillation curve of the organic yields corresponding to the balances made in the Example 2 according to the invention.

The simulated distillation curve given in FIG. 4 indicates the distribution of the formed products in term of boiling temperature and rate. This graph shows that products into the distillation gap of gasoline and diesel fuel are obtained by this process. The different curves represent the simulated distillation of the organic yields corresponding to the different balances of the Table 3. Thus, for example in the case of the balances 7 and 9, 40% of the hydrocarbon fraction has a boiling point temperature above 150° C.

Example 3

According to the Invention

A simulation of the method involving a stage of recycling the separated gas phase was carried out.

As in the previous example, the catalyst used is the commercial solid IS463 (also bearing the in-house designation GOD200).

The ethanol feedstock is first flashed at 20° C. under 3 MPa, then heated to 400° C. The ethanol is dehydrated to ethylene up to a reaction progress rate of 97% and the oligomerization reaction is carried out with an ethylene conversion progress rate of 40% per pass.

The recycled C4+ compounds are oligomerized or the ethylene present is added thereto, with a product distribution comparable to the reaction without recycling. After decrease of the temperature after the reaction down to a value ranging between 50° C. and 200° C., the reaction mixture is separated into three phases (aqueous, hydrocarbons and gas) at 3 MPa.

Table 4 hereafter gives the evolution of the gasoline and gas oil yields as a function of the temperature of the separator, considering a very low purge, set to 0.1% by mass of the recycle loop.

TABLE 4

| T separator (° C.) | 100 | 110 | 120 | 130 | 140 | 150 | 160 | 170 | 180 | 190 | 200 | 210 | 220 |
|---|---|---|---|---|---|---|---|---|---|---|---|---|---|
| Recycle | 2.0 | 2.1 | 2.3 | 2.4 | 2.6 | 2.8 | 3.0 | 3.4 | 3.9 | 4.7 | 6.1 | 8.9 | 17.5 |
| Gasoline yield (%) | 28 | 28 | 28 | 28 | 28 | 28 | 27 | 27 | 26 | 24 | 21 | 17 | 10 |
| Gas oil yield (%) | 23 | 23 | 24 | 25 | 26 | 27 | 28 | 29 | 31 | 34 | 37 | 42 | 49 |
| Liquid yield (%) | 50 | 51 | 52 | 53 | 54 | 55 | 55 | 56 | 57 | 58 | 58 | 59 | 59 |

These values show that the amount of gas oil obtained increases significantly with the recycle ratio.

Simply to have an order of magnitude concerning the production of gas oil, assuming that it is possible to work with an available amount of ethanol of the order of 200,000 tons/year, under such conditions, at a temperature of 200° C. (recycle equal to 6), a gas oil yield of the order of 74,000 tons/year and a gasoline yield of the order of 42,500 tons/year would be reached, the rest being a production of water.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 06/04.928, filed May 30, 2006, is incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of converting ethanol by dehydration-oligomerization in a single stage to a base stock for diesel fuel, comprising:
   a reaction step (a) of contacting the ethanol in a reactor with an acid catalyst, amorphous or structured, predominantly mesoporous, comprising at least 60% pores whose size ranges between 2 and 50 nm, and being any of activated delta, gamma or eta aluminas to produce a gas phase under conditions wherein water formed during dehydration remains as a gas in the reactor, and
   a step (b) of separating in a separator operating at a sufficiently low temperature to form an organic liquid phase, an aqueous liquid phase and a residual gas phase.

2. A method as claimed in claim 1, wherein said catalyst is a gamma or delta alumina of external surface area ranging between 130 and 350 m$^2$/g and of pore volume, measured by mercury intrusion, ranging between 0.3 and 1.2 cm$^3$/g.

3. A method as claimed in claim 1, wherein stage (a) is carried out at a temperature ranging between 300° C. and 500° C., at a pressure ranging between 2 and 10 MPa and at a WHSV of 0.2 to 4 h$^{-1}$.

4. A method as claimed in claim 3, comprising a catalyst regeneration step.

5. A method as claimed in claim 4, wherein regeneration is performed in an air stream at a pressure ranging between the atmospheric pressure and the reaction pressure, and at a temperature selected between 400° C. and 600° C.

6. A method as claimed in claim 3, wherein stage (b) of separating said gas phase, said organic liquid phase and said aqueous liquid phase is carried out at the reaction pressure lowered by equipment pressure drops.

7. A method as claimed in claim 1, wherein at least part of the residual gas phase separated in stage (b) is recycled to an inlet of stage (a).

8. A method as claimed in claim 1, further comprising subjecting at least part of the organic liquid effluent from separation stage (b) to hydrogenation.

9. A method as claimed in claim 8, wherein hydrogenation is carried out by contact with a hydrogen-rich gas over a hydrogenation catalyst containing a metal from group VIII, an alumina, silica or silica-alumina type support, at a LHSV of 1 to 8 h$^{-1}$, at a temperature ranging between 100° C. and 250° C. at the reactor inlet and at an operating pressure ranging between 2 and 5 MPa.

10. A method as claimed in claim 9, wherein said hydrogenation catalyst comprises 0.1 to 10% by mass of palladium.

11. A method as claimed in claim 9, wherein said hydrogenation catalyst comprises 1 to 60% by mass of nickel.

12. A method according to claim 1, wherein the temperature of the separator is set to recover at least 80% of the gas oil fraction produced in the reaction.

13. A method according to claim 12, wherein the separator is conducted at 60° C. to 200° C. and a pressure of about 3 Mpa.

14. A method as claimed in claim 7, further comprising subjecting at least part of the organic liquid effluent from separation step (b) to hydrogenation.

15. A method according to claim 7, wherein the recycle ratio is adjusted to obtain a desired gas oil to gasoline ratio.

16. A method according to claim 1 wherein the acid catalyst consists essentially of any of activated delta, gamma or eta aluminas.

17. A method according to claim 1 wherein the acid catalyst consists of any of activated delta, gamma or eta aluminas.

18. A method of converting ethanol by dehydration-oligomerization in a single stage to a base stock for diesel fuel, comprising:
   a reaction step (a) of contacting the ethanol in a reactor with an acid catalyst, amorphous or structured, predominantly mesoporous, comprising at least 60% pores whose size ranges between 2 and 50 nm, and being a gamma or delta alumina of external surface area ranging between 130 and 350 m$^2$/g and of pore volume, measured by mercury intrusion, ranging between 0.3 and 1.2 cm$^3$/g to produce a gas phase under conditions wherein water formed during dehydration remains as a gas in the reactor, and
   a step (b) of separating in a separator operating at a sufficiently low temperature to form an organic liquid phase, an aqueous liquid phase and a residual gas phase.

* * * * *